Jan. 13, 1959     N. G. HOVLID     2,868,525
AQUARIUM AERATING DEVICE
Original Filed Nov. 29, 1955
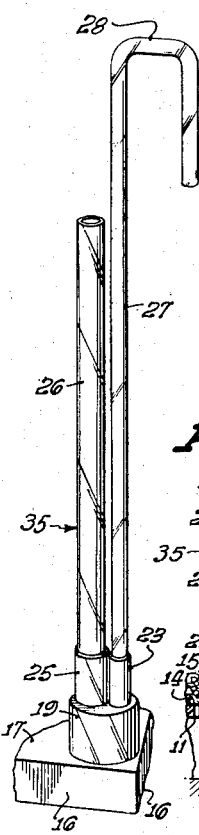
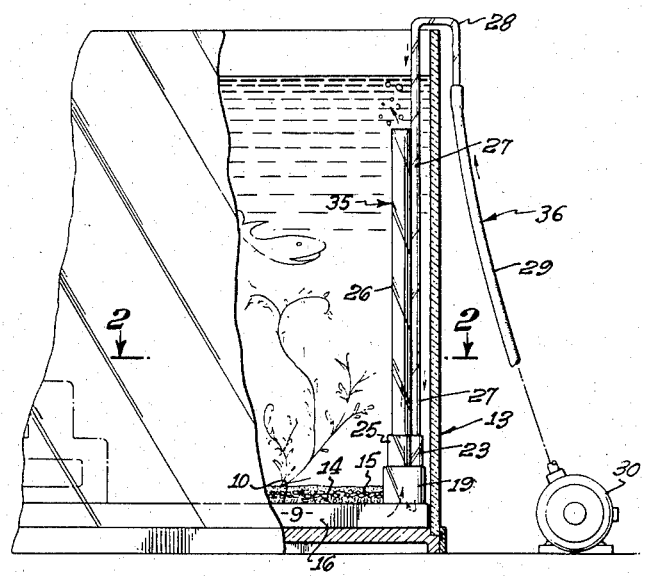
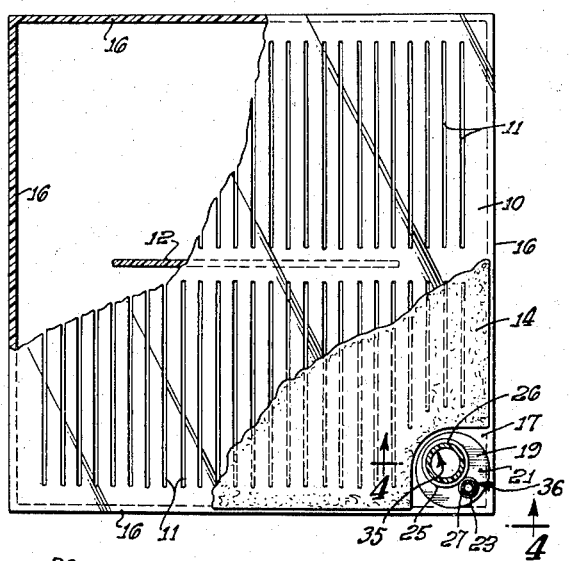
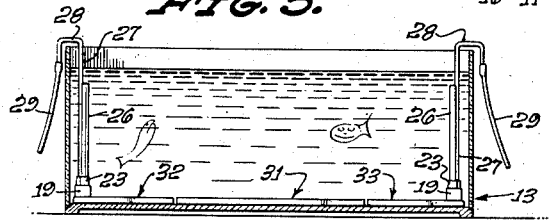
NORMAN G. HOVLID,
INVENTOR.
BY
Fulwider, Mattingly & Huntley
ATTORNEYS

United States Patent Office 2,868,525
Patented Jan. 13, 1959

2,868,525

AQUARIUM AERATING DEVICE

Norman G. Hovlid, Long Beach, Calif.

Original application November 29, 1955, Serial No. 550,039, now Patent No. 2,748,075, dated May 29, 1956. Divided and this application March 12, 1956, Serial No. 570,997

1 Claim. (Cl. 261—121)

This application is a division of application Serial No. 550,039, filed by me November 29, 1955, and issued to me on May 29, 1956 as Patent No. 2,748,075.

This invention relates to aquariums, and is particularly concerned with purification, aeration and filtration of water in small aquariums in which fish are kept as a study, entertainment, or hobby.

It has long been known that the health and activity of fish kept in confined bodies of water such as domestic aquariums is dependent upon the purity of the aquarium water. Aquarium water is rendered impure primarily from sewage made up of waste fish food materials and fish excreta. Although various water filtering devices have been heretofore proposed for eliminating such waste matter, the effectiveness of such devices has been of a very low order. Accordingly, it is now necessary to clean and change the water in such aquariums on frequent occasions.

It is a major object of the present invention to provide new and novel aquarium apparatus for converting aquarium sewage into non-toxic chemical compounds. The utilization of such apparatus eliminates frequent cleaning and water changing operations.

Another object of the present invention is to provide a simple, inexpensive and uncomplicated device for effecting filtration, aeration and circulation of the water of an aquarium.

A further object of the present invention is to provide a device of the aforedescribed nature which is simple in design, foolproof in operation and capable of affording a long service life.

Together with the foregoing, it is an object to secure these features and advantages by apparatus easily installed, readily removable for cleaning, attractive in appearance, and admirably designed to meet the demands of economic manufacture and hence, saleable at a modest price within the range of persons of limited resources.

These and other objects of the present invention will become apparent from the following detailed description of a preferred embodiment thereof, when taken in conjunction with the following drawings, wherein:

Figure 1 is a fragmentary side elevation, partly in section, of an aquarium equipped with the preferred form of apparatus embodying the present invention;

Figure 2 is a horizontal sectional view taken on line 2—2 of Figure 1, and showing the construction of said apparatus;

Figure 3 is a perspective view of a detail of said apparatus;

Figure 4 is an enlarged detail sectional view of the lower end of the detail shown in Figure 3; and Figure 5 is a longitudinal vertical sectional view of a large aquarium showing multiple installations of the apparatus of the invention.

Referring to the drawings, the preferred form of apparatus embodying the present invention is adapted for use with a conventional domestic aquarium 13 and broadly includes a support 10 upon which is disposed glass wool and/or gravel 14 and 15, respectively. The support 10 is spaced above the bottom of the aquarium 13 so as to define a clean-water collection chamber 9 between the underside of the support and the bottom of the aquarium. The support 10 is formed over substantially its entire area with a plurality of openings 11 which permit the free downward movement of water through the glass wool and/or gravel 14 and 15 into the clean-water collection chamber 9. Preferably, the openings 11 will be small enough in area to substantially restrain all of the particles of gravel 15 from falling into the clean-water collection chamber 9. The glass wool 14 will then not be required. These openings 11, however, should be adequate in number and large enough in area to permit "flotation" of substantially all of the gravel particles 15. The term "flotation" used herein relates to the surrounding of each gravel particle 15 with free flowing water whereby the maximum volume and hence weight of each particle will be displaced by such water. In this manner, the gravel particles 15 will remain comparatively loose and hence will not tend to become packed. The apparatus also includes passage means, generally designated 35 (to be described fully hereinafter) for conducting water upwardly from the clean-water collection chamber to the upper portion of the aquarium 13, as well as means, generally designated 36 (also to be described fully hereinafter), for effecting the downward circulation of water into the clean-water collection chamber 9 and upwardly through the aforementioned passage means 35 into the upper portion of the aquarium 11.

With the aforedescribed arrangement, the aquarium sewage will be urged downwardly into the spaces between the gravel particles 15. Here the aerobic bacteria existing within these spaces convert such trapped sewage into non-toxic chemical compounds. These aerobic bacteria have been found to flourish in the spaces between the gravel particles inasmuch as the conditions therein are ideal for their rapid reproduction. The downwardly moving water carries all of the oxygen required for the propagation of the aerobic bacteria. The "flotation" of the gravel particles 15 prevents the sewage from causing the gravel to become tightly packed, and hence the free downward circulation of water will not be interrupted. The gravel 15 may be properly termed a "conversion bed," inasmuch as the water-borne sewage is converted into non-toxic chemical compounds within its confines. The sewage-free water then descends into the clean-water collection chamber 9 from which it is returned through passage means 35 to the upper portion of the aquarium 13.

With regard to a more particular description of the preferred form of apparatus, the support 10 comprises a thin, flat, planular plate 10 preferably of plastic or like non-corrosive material. The entire apparatus is preferably of plastic, is economical, easily fabricated, durable and non-corrosive. The device may be transparent or colored, depending upon the particular motif of the aquarium itself. The invention is, of course, in no way limited to any such selection of materials. The plate 10 is perforated by parallel transverse slots 11 extending from a point adjacent to one edge to a point adjacent to a center line normal thereto. Thus, two series of slots 11 are present, their adjacent ends being spaced apart sufficiently to accommodate a central vertical supporting bar 12. The total area of the plate 10, when disposed horizontally within the aquarium 13, is preferably that of the bottom of the aquarium to provide an entire removable or false perforated bottom.

As indicated in Figure 5, larger aquariums may utilize multiples of the platforms with or without the associated circulating and aerating means. The area of the openings of the plate 10 is preferably between 10 to 60 percent of the total area, thus to insure both adequate water passage therethrough and ample supporting surface for glass wool and/or gravel filtering medium, indicated at 14 and 15 respectively (Figures 2 and 4).

For supporting the plate 10 in upwardly spaced relation to the bottom of the aquarium, side edge pieces 16 are attached or formed integrally with the plate. Where but a single unit is to cover the entire aquarium floor, the side pieces 16 may be uninterrupted and join at the corners of the plate. If, however, multiple units, as indicated in Figure 5, are to be employed, at least some of the side pieces are intercepted or perforated to permit free flow of water thereunder from one to another. The height of the side pieces is not critical, but is such to insure free water flow under the plate 10 without appreciably diminishing the useful internal height of the aquarium. It will, of course, be understood that the height of the side pieces is uniform and that they are equal in height to that of the central supporting bar 12 so that the plate is supported substantially parallel to the bottom of the aquarium and constitutes a perforated false bottom uniformly spaced therefrom.

At one corner of the platform 10 the slots 11 terminate short of the edge to provide a free space 17 through which an aperture 18 of substantial size is formed. The edges of the aperture 18 conform with and sealingly engage the lower edges of a cylindrical member 19 forming an air and water or bubble-forming chamber 20. The upper end of the chamber 20 is closed by a cover 21 having at one side an air inlet aperture 22 communicating with an air inlet nipple 23 of larger internal diameter than the air inlet aperture 22. Adjacent the air inlet aperture 22 is a water and bubble aperture 24 communicating with a circulating tube nipple 25. Within the nipple 24 is seated the lower end of the circulating tube 26, the internal diameter of which is greater than the diameter of the water and bubble aperture 24. Air at a pressure only slightly exceeding the water pressure in the chamber 20 induced by the hydrostatic head thereabove, is supplied to the aperture 22 through nipple 23 from an air supply tube 27, the lower end of which is seated in the nipple. The upper end of the air supply tube 27 is formed with a goose neck 28 to press over the edge of the side of the aquarium and its end attached by a flexible tube 29 to an air supply pump 30 of conventional design.

For packaging, the circulating tube 26 and air supply tube 27 may be laid against the bottom of the plate 10 within the confines of the edge pieces 16. If desired, the cylindrical chamber forming member 19 may also be detachable, and the height of the edge pieces 16 may be such as to secure such member thereto to provide a flat package. For use, the tube 26 is inserted in the nipple 25 and the tube 27 is inserted in the nipple 23. With the aquarium empty, the plate is then lowered to the bottom. The edge pieces 16 and supporting bar 10 locate the plate horizontally in uniform spaced relation above the bottom of the aquarium. With the plate so positioned, filtering material such as the glass wool 14 and/or sand or gravel 15 may be laid over the upper surface as illustrated. The aquarium is then filled with fresh water, the fish are placed therein, and such plants, food, or decorative pieces are inserted.

In the operation of the device, either continuously or intermittently, air is supplied from the pump 30 through tubes 29 and 30 to the chamber 20 at a pressure only slightly exceeding the water pressure at the bottom of the aquarium. Thus the accumulation of air in the chamber is gradual, its flow also being limited by the restricted orifice 22 through which the nipple 23 connects with the chamber 20. Water from below the plate 10 will, of course, enter the chamber 20 and lower end of tube 26. As the air accumulates in chamber 20, it forms a bubble, which by virtue of the diameter of the chamber, is of greater dimension than the aperture 24 or the internal diameter of the tube 26. When the surface tension of the water is overcome by the pressure of the air bubble, the buoyancy of the bubble overcomes the weight of water thereabove in the tube 26, and the bubble squeezes through aperture 24 and expands in tube 26 moving upwardly to carry before it the water thereabove, thus acting to pump water upwardly through the tube. It will be understood, of course, that in operation such bubbles successively pass into the tube between entrances of limited increments of water so that the individual bubbles do not lift a whole column of water in the tube, except perhaps, when operation is first initiated.

As the water is then pumped up through the tube 26, replacement water enters the chamber 20 from beneath the plate 10. Thus, a continuous circulation is achieved, and since the plate is uniformly perforated by slots 11, a uniform downward flow of water through the entire filter area is insured. Since the air and water are in contact in the chamber 20, and throughout their travel up the tube 26, toxic gases generated by the anaerobic bacteria enter the bubble to be carried therewith to the water surface, while oxygen from the bubble re-oxygenates the water which has been purified by passage through the filter. The top of the circulating tube 26 is maintained below the surface of the water, and thus as the bubbles emerge, they expand and break while completing their travel to the surface whereby they filter and oxygenate the water while liberating the noxious gases to the atmosphere.

The precise structure of the plate 10 is dependent upon several conflicting forces. Although it is desirable that the percentage area of the slots 11 be as high as possible relative to the total area of the plate, it should be realized that there is a certain maximum percentage for each thickness of plate 10 which may be selected. When this maximum is exceeded, there is simply not enough plate material left to lend sufficient physical rigidity thereto to maintain a predetermined shape, as well as support a layer of sand or gravel, or a combination thereof on the upper surface of the plate.

In the event a relatively heavy layer of sand and gravel is to be placed on the plate 10, the thickness of the plate must either be increased or the ratio of the area of the slots to the total plate area must be cut down to give the plate the necessary physical rigidity to support such a relatively heavy load.

A large percentage of slot or opening area relative to total plate area is desirable, as it permits circulation of water through the sand bed in sufficient quantity that the growth of aerobic bacteria is stimulated. Likewise, a relatively thick layer of sand is desirable in that it provides an environment in which the aerobic bacteria develop, and one that takes waste material a sufficient length of time to pass therethrough for it to be fully converted by the bacteria during this passage. However, if the thickness of the sand bed is excessive, the circulation of oxygen-bearing water therethrough is so slight that the aerobic bacteria do not develop in sufficient quantities to convert waste material falling to the bottom of the aquarium. Failure of waste material to be so converted ultimately fouls the water in the aquarium to the extent that it is impossible for fish to live therein.

Therefore it will be apparent that the thickness of the sand bed must be sufficient to provide a healthy environment in which aerobic bacteria may develop, and that the thickness of the bed and the percentage area of the plate that is in the form of openings or slots should be so adjusted to that thickness to permit circulation of water through the bed in sufficient quantity to furnish adequate oxygen to the bacteria, but with the rate of said circulation being sufficiently slow that solid organic waste will be converted to materials harmless to fish prior to passing through said bed.

It will be apparent that various changes may be made with respect to the aforedescribed apparatus without departing from the spirit of the invention or the scope of the following claim.

I claim:

A water and circulating device for use in an open-topped aquarium having a horizontal floor, comprising: a perforated plate that is supported horizontally in vertically spaced position above the floor of said aquarium so as to define a water passage space between said plate and said floor; a vertically extending bubble forming chamber extending upwardly from said plate and having a bottom end that is open for the admission of aquarium water upwardly thereinto from said water passage space, said bubble chamber having imperforate sides and a closed cover which is formed at one side with an air inlet aperture and at another side with a water and bubble outlet aperture, said air inlet aperture having an area less than the area of said outlet aperture and the combined areas of said inlet and outlet apertures being less than the area of the lower end of said bubble chamber; a circulating tube connected with said outlet aperture that extends upwardly from said bubble chamber through said aquarium to the upper portion of the latter; and an air inlet tube connected with said inlet aperture and extending upwardly through said aquarium to connect said bubble chamber with a source of air existing at a pressure in excess of the hydrostatic head within said aquarium at the elevation of said outlet aperture whereby bubbles of air are intermittently formed in said bubble chamber of greater cross-sectional area than the area of said outlet aperture, each of said bubbles buoyantly rising through said outlet aperture and said circulating tube between increments of water with said bubbles substantially completely occupying the cross-sectional area of said circulating tube during their ascent therethrough so as to circulate water from said water passage space upwardly through said outlet chamber, the water displaced from said water passage space being replenished by downward circulation of aquarium water through said plate.

References Cited in the file of this patent

UNITED STATES PATENTS

| | | |
|---|---|---|
| 1,055,082 | Rogers | Mar. 4, 1913 |
| 1,574,783 | Beth | Mar. 2, 1926 |
| 1,719,254 | Wofford | July 2, 1929 |
| 2,229,452 | Hammer et al. | Jan. 21, 1941 |
| 2,303,757 | Pierson | Dec. 1, 1942 |
| 2,614,529 | Hansen | Oct. 21, 1952 |
| 2,653,908 | Rodda | Sept. 29, 1953 |
| 2,730,496 | Zavod | Jan. 10, 1956 |
| 2,737,490 | Lambertson | Mar. 6, 1956 |
| 2,748,075 | Hovlid | May 29, 1956 |

FOREIGN PATENTS

| | | |
|---|---|---|
| 113,572 | Germany | Sept. 27, 1900 |
| 462,418 | Italy | Mar. 17, 1951 |